United States Patent
Park et al.

(10) Patent No.: US 9,906,751 B2
(45) Date of Patent: Feb. 27, 2018

(54) USER INTERFACE TECHNIQUES FOR TELEVISION CHANNEL CHANGES

(71) Applicant: OpenTV, Inc., San Francisco, CA (US)

(72) Inventors: Joonyoung Park, Los Altos, CA (US); Jihyun Park, Incheon (KR); Samir Mehta, Los Altos, CA (US)

(73) Assignee: OPENTV, INC., San Francisco, CA (US)

( * ) Notice: Subject to any disclaimer, the term of this patent is extended or adjusted under 35 U.S.C. 154(b) by 847 days.

(21) Appl. No.: 14/099,805

(22) Filed: Dec. 6, 2013

(65) Prior Publication Data
US 2015/0163445 A1    Jun. 11, 2015

(51) Int. Cl.
| | |
|---|---|
| *G06F 3/0485* | (2013.01) |
| *H04N 5/50* | (2006.01) |
| *H04N 5/45* | (2011.01) |
| *H04N 5/445* | (2011.01) |
| *H04N 21/431* | (2011.01) |
| *H04N 21/482* | (2011.01) |

(52) U.S. Cl.
CPC ........... *H04N 5/50* (2013.01); *H04N 5/44591* (2013.01); *H04N 5/45* (2013.01); *H04N 21/4316* (2013.01); *H04N 21/482* (2013.01); *H04N 2005/44556* (2013.01)

(58) Field of Classification Search
CPC ............ G06F 17/30852; G06F 3/0485; H04N 2005/44556; H04N 21/4316; H04N 21/482; H04N 5/44591; H04N 21/42207; H04N 2005/441; H04N 2005/4423
See application file for complete search history.

(56) References Cited

U.S. PATENT DOCUMENTS

| | | | | |
|---|---|---|---|---|
| 2,896,018 | A | * | 7/1959 | Rhodes ............... H04N 5/50 331/36 R |
| 5,808,608 | A | * | 9/1998 | Young ............ G04G 15/006 348/563 |
| 6,384,869 | B1 | * | 5/2002 | Sciammarella .... H04N 5/44591 348/564 |

(Continued)

OTHER PUBLICATIONS

International Search Report and Written Opinion for PCT/US2015/010233 dated Mar. 4, 2015, 11 pp.

*Primary Examiner* — Anil Bhargava
(74) *Attorney, Agent, or Firm* — Procopio, Cory, Hargreaves & Savitch LLP

(57) ABSTRACT

An improved user premises device enhances the channel change experience. In response to a channel-up or a channel-down command, a currently displayed program is re-sized to fit within a smaller program window. In the display area that is exposed due to the re-sizing of the currently displayed program, additional content such as an advertisement or channel change progress information is displayed. Additional program windows that render snapshots of content from one or more program up and one or more program down may be displayed in windows that are organized in a vertical alignment with the program window of the currently displayed program. The program windows are animated or scrolled in a direction to bring the program window of the user-desired next program in place of the program window of the currently displayed programmed. The program window of the next program is then resized to occupy the entire display.

26 Claims, 11 Drawing Sheets

(56) References Cited

U.S. PATENT DOCUMENTS

| | | | | |
|---|---|---|---|---|
| 6,425,129 B1* | 7/2002 | Sciammarella | H04N 5/44543 | |
| | | | | 348/E5.002 |
| 6,721,953 B1* | 4/2004 | Bates | H04N 5/44543 | |
| | | | | 348/E5.102 |
| 6,795,972 B2* | 9/2004 | Rovira | H04N 7/163 | |
| | | | | 348/E5.002 |
| 7,050,073 B2* | 5/2006 | Abler | G09G 5/346 | |
| | | | | 345/684 |
| 7,313,764 B1* | 12/2007 | Brunner | G09G 5/34 | |
| | | | | 345/684 |
| 7,610,599 B1* | 10/2009 | Nashida | H04N 5/44543 | |
| | | | | 715/700 |
| 7,650,569 B1* | 1/2010 | Allen | G06F 3/0482 | |
| | | | | 715/720 |
| 8,060,907 B2* | 11/2011 | Watanabe | H04N 5/4403 | |
| | | | | 725/40 |
| 8,156,526 B2* | 4/2012 | Lee | H04N 5/44543 | |
| | | | | 725/40 |
| 8,589,977 B1* | 11/2013 | Frusciano | H04N 5/44543 | |
| | | | | 715/785 |
| 8,924,854 B2* | 12/2014 | Allen | G06F 3/0482 | |
| | | | | 715/719 |
| 9,024,864 B2* | 5/2015 | Dunton | G06F 3/0482 | |
| | | | | 345/156 |
| 9,032,296 B1* | 5/2015 | Jeffs | H04N 21/8586 | |
| | | | | 715/719 |
| 9,088,829 B2* | 7/2015 | Frusciano | H04N 5/44543 | |
| 2002/0033848 A1* | 3/2002 | Sciammarella | G06F 3/0481 | |
| | | | | 715/838 |
| 2003/0046693 A1* | 3/2003 | Billmaier | G06F 3/0482 | |
| | | | | 725/39 |
| 2005/0071782 A1* | 3/2005 | Barrett | H04N 5/45 | |
| | | | | 715/838 |
| 2006/0212829 A1* | 9/2006 | Yahiro | G06F 3/0482 | |
| | | | | 715/810 |
| 2006/0218591 A1* | 9/2006 | Billmaier | G06F 3/0481 | |
| | | | | 725/52 |
| 2007/0189737 A1* | 8/2007 | Chaudhri | G06F 3/0482 | |
| | | | | 386/234 |
| 2007/0195197 A1* | 8/2007 | Seong | H04N 5/4401 | |
| | | | | 348/569 |
| 2009/0172543 A1 | 7/2009 | Cronin et al. | | |
| 2009/0204929 A1* | 8/2009 | Baurmann | H04N 5/44543 | |
| | | | | 715/836 |
| 2009/0303676 A1* | 12/2009 | Behar | G06F 1/162 | |
| | | | | 361/679.27 |
| 2010/0073565 A1* | 3/2010 | Hwang | H04N 5/44591 | |
| | | | | 348/564 |
| 2010/0122290 A1* | 5/2010 | Allen | G06F 3/0482 | |
| | | | | 725/38 |
| 2010/0199308 A1 | 8/2010 | Hall et al. | | |
| 2011/0083148 A1* | 4/2011 | Sakaguchi | H04N 5/44543 | |
| | | | | 725/39 |
| 2011/0231878 A1 | 9/2011 | Hunter et al. | | |
| 2012/0079430 A1* | 3/2012 | Kwahk | G06F 3/0488 | |
| | | | | 715/834 |
| 2015/0150053 A1* | 5/2015 | Hardin | H04N 21/44222 | |
| | | | | 725/52 |

* cited by examiner

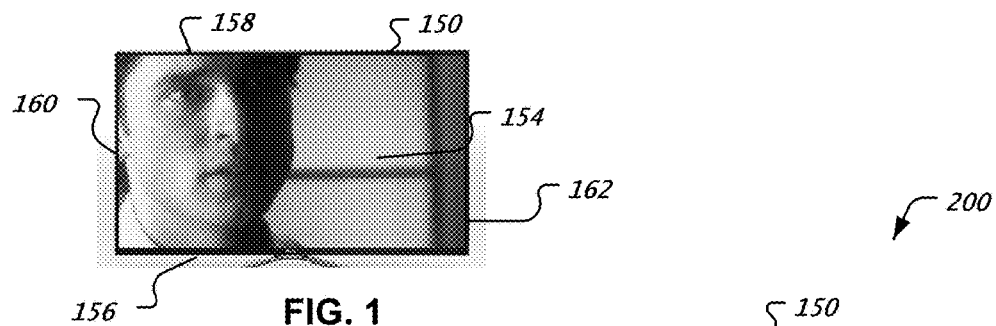
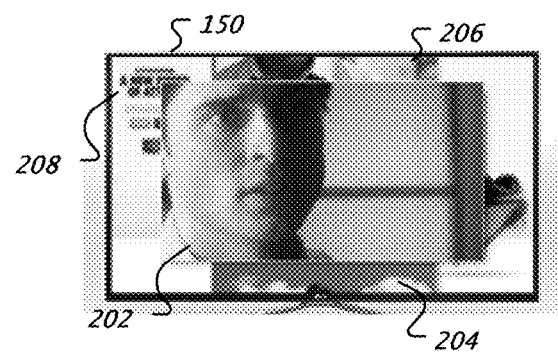
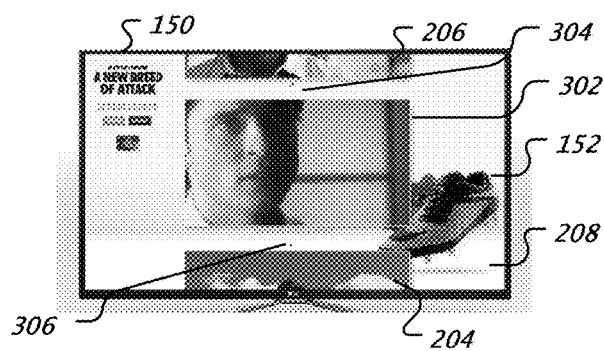
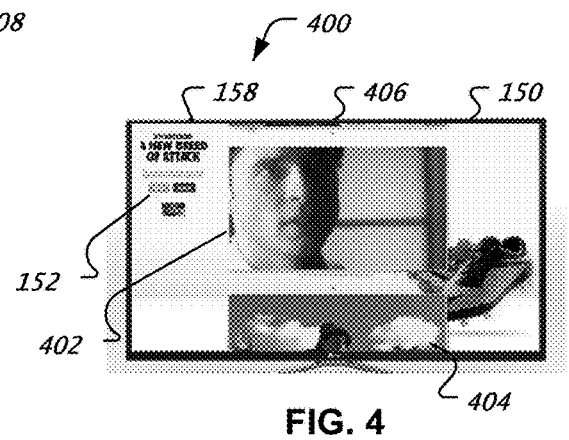

USER INTERFACE TECHNIQUES FOR TELEVISION CHANNEL CHANGES

BACKGROUND

This patent document relates to presentation of digital video programs and, in one aspect, to user experience during changing program channels.

Digital video delivery systems offer improved video quality over conventional analog video delivery systems and other benefits. User experience in changing program or television channels is an important aspect of the quality parameters in digital video delivery systems. However, channel change times in certain existing digital video delivery systems tend to be slower than channel change times in analog delivery systems.

SUMMARY

Techniques for controlling on-screen display of content during a channel change are disclosed. In some embodiments, prior to a user-initiated channel change, a current program may be displayed on the entire display area. Upon receiving a channel change request, the display size of the current program is reduced to make room for displaying content from the next program. In some embodiments, display windows for the current program and the next program are arranged in a vertical alignment. The aligned windows may be non-overlapping and may be animated (e.g., scrolled) in a vertical direction to provide a visual feedback to the user that processing of a channel change is currently underway. Once the window for the next program reaches a pre-designated location, such as the position previously occupied by the current program window, the next program window is rescaled to occupy the entire display screen area. In some embodiments, during the scrolling operation, other visual information, e.g., animated graphics or advertisements, are displayed on screen area not occupied by the current program or the next program.

In one aspect, a method of visually presenting channel changes on a display is disclosed. The method includes displaying a first program in a first window at a first position on the display, receiving a first channel change command, changing, in response to the first channel change command, a first visual characteristic of the first window, thereby exposing a portion of a background layer of the display, displaying at least a portion of a second program in the exposed portion of the display in a second window that is positioned in a vertical direction with respect to the first window, automatically scrolling the first window and the second window across the display in the vertical direction, such that the first window begins to move out of the display while the second window begins to move in a direction of the first position and changing, after the second window is at the first position on the display, a second visual characteristic of the second window such that the second window occupies the display, with the first window disappearing from the display.

In another aspect, an apparatus for providing visually continuous channel changes on a display having a display area is disclosed. The apparatus includes a display module that displays a current program on substantially all of the display area, a command reception module that receives a command for viewing a next program, a first rescaler module that rescales, in response to the command, in a visually continuous manner, the current program to fit within a first window in the display occupying an original position on the display, a presentation module that presents, at least a part of the next program, in a second window that is positioned in a second portion of the display that is non-overlapping with the first portion, a window transition module that transitions out, in a visually continuous manner, the first window from the display area while transitioning in the second window to the original position previously occupied by the first window, and a second rescaler module that expands the second window, after the second window is at the original position, to occupy substantially all of the display area.

In yet another aspect, a disclosed method for controlling a display to provide an enhanced channel change experience includes displaying a first channel, receiving a first command to view a second channel, initiating a channel change from the first channel to the second channel, in which the channel change includes reducing a display size of the first channel, progressively displaying video from the second channel as more and more data for the second channel is received, scrolling out the first channel such that the first channel gradually disappears from the display, correspondingly scrolling the second channel to take an on-screen position of the first channel, and expanding the second channel to a full size after sufficient data for the second channel is available, receiving, amid the channel change and prior to the expanding the second channel to the full size, a second command to view a third channel, and in response to the second command and progressively displaying video from the third channel as more and more data for the third channel is received, scrolling out the first channel and the second channel such that the first channel and the second channel gradually disappear from the display, correspondingly scrolling the third channel to take a position of the first channel, and expanding the third channel to a full size after sufficient data for the third channel is available.

In yet another aspect, a disclosed apparatus for displaying multiple video programs simultaneously includes a first display module to display a first video program in a first program window, a second display module to display a second video program in a second program window, a display window management module to control sizes and positions of the first program window and the second program window such that the second program window is non-overlapping with and positioned directly adjacent to the first program window, a command module that receives a first command to change channel from the first program to a second program, a transition module that causes, responsive to the first command, the first program window and the second program window to transition from an initial state in which the first program window is completely visible and at a first position on the screen and a final state in which the first program window is completely invisible and the second program window is at the first position, a first rescaler module that rescales the first program window from a first full-screen mode in which the first program window occupies an entire screen display area to a first window-mode in which the first program window occupies less than the entire screen display area and a second rescaler module that rescales the second program window from a second window-mode in which the second program window occupies less than the entire screen display area and a second full-screen mode in which the second program window occupies the entire screen display area.

These, and other aspects and examples of implementations are described below in the drawings, the description and the claims.

BRIEF DESCRIPTION OF THE DRAWINGS

FIG. 1 shows an example display screen on which a current program is displayed.

FIG. 2 shows an example display screen on which a current program is rescaled and displayed.

FIG. 3 shows an example display screen on which a current program and a next program are displayed.

FIG. 4 shows an example display screen on which a current program and a next program are displayed and scrolled in a vertical direction.

Like reference symbols in the various drawings indicate like elements.

DETAILED DESCRIPTION

Figure 5:
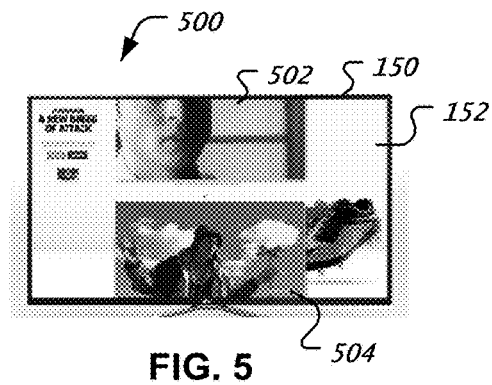
FIG. 5 shows an example display screen on which a current program and a next program are displayed and further scrolled in a vertical direction.

In some digital program delivery networks, such as certain digital cable networks or direct-to-home satellite networks, channel changes may be relatively slow and exhibit a noticeable delay, e.g., a delay from 1.5 seconds to 2 seconds. In some systems, changing channels between high definition programs take even a longer amount of time, e.g., 2.7 to 4.5 seconds. Certain digital delivery systems with higher resolution formats, e.g., ultra high definition or 4K formats, may have longer channel change times than some existing digital delivery systems. Similarly, relatively long channel change times may be experienced when changing between a broadcast program, a video on demand program, a program being retrieved from a digital video recorder, and so on.

During the time between when a channel change request is received and when the desired new channel is displayed, a user device (e.g., a set-top box or a digital television, or a handheld device such as a tablet computer) may perform one or more operations such as table parsing, re-tuning a tuner, filling decoding buffers with video data, and so on. Some digital delivery systems are used to display a black (or blank) screen with some information about the new channel until sufficient data is received for the new channel to be able to show all or a part of the video of the next channel.

Some users find the channel delay times in some of the existing digital delivery systems to be excessive, thus reducing the quality of the user experience. Further, during the time in which a user device is updating the display by discontinuing displaying the current program and beginning to display the next program, the user has very little feedback about what progress is going on in the user device for the requested channel change. The inventors recognized that the time delay during changing channels, e.g., the 2 to 4 seconds channel change time in some systems, can be beneficially used to provide additional or useful information to the users to keep the user visually engaged with the television viewing experience, e.g., providing a great opportunity to display advertisements and/or other visual content to a user. The inventors also observed that, when there is no apparent visual feedback related to a channel change, users may impatiently press channel-up or channel-down controls at a rate faster than the time it takes to achieve a channel change. As a result, when a user puts a user device in such a continuous channel change mode in which the user device attempts to change multiple channels in a sequence, the display may go blank (or may display broken tiles of video) for 2 to 10 seconds, which may be disruptive to the user's television viewing experience.

The techniques disclosed in the present document can be implemented in various ways that overcome the above-discussed shortcomings in a user's television viewing experience and problems associated with presentation of digital video programs, and, in addition, can be implemented in ways that improve or enhance the user experience in changing program or TV channels. In various embodiments, using the disclosed techniques, changing from one program being viewed (whether broadcast television, or streaming content, or using another delivery mechanism) to another may be implemented.

In some disclosed embodiments, a user-requested channel change may take approximately the same amount of time as in other digital systems, but instead of displaying a blank or black screen to the user during the channel change time, the display may present moving pictures and/or other content of interest to the user. For example, in some embodiments, a "fortune cookie" type message may be displayed to the user. In some embodiments, a trivia question may be displayed to the user, and an answer may be provided during the channel change time or the next time the user changes a channel. In some embodiments, pre-cached daily comic strips may be displayed to the user during the channel change time. In various embodiments, the displayed text and graphics may be provided by a television service provider, a user device manufacturer and may or may not be related to the channel the user is changing from or changing to. Those and other embodiments use the delay in changing channels to provide interesting or useful contents.

Figure 22:
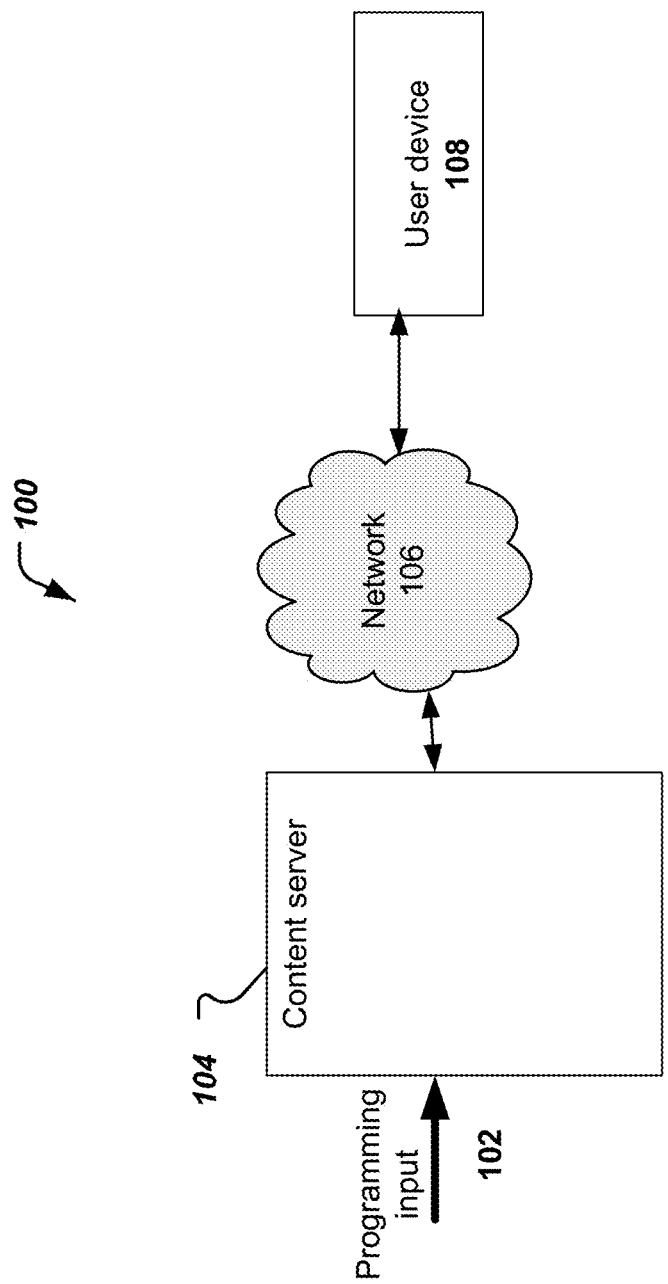
FIG. 22 depicts high level architecture of an example communication network.

FIG. 22 depicts an example content network 100. A user device 108 (e.g., a set-top box, a home gateway device, a digital television, a handheld or mobile device, etc.) may be communicatively coupled with a content server 104 that servers, unicasts or broadcasts multiple audio/video programs, or channels, to the user device 108 over a network 106. The content server 104 may receive the programming from programming inputs 102 from content providers. In various embodiments, the content server 104 can be implemented as a cable headend, a satellite headend, a personal video recorder box at a user residence, or a streaming server, etc. In various embodiments, the network 106 may include one or more networking technologies such as wired (cable, digital subscriber loop or fibre optic lines) or wireless (802.11, microwave, 3G or 4G networks, WiMAX, satellite, etc.).

Figure 23:
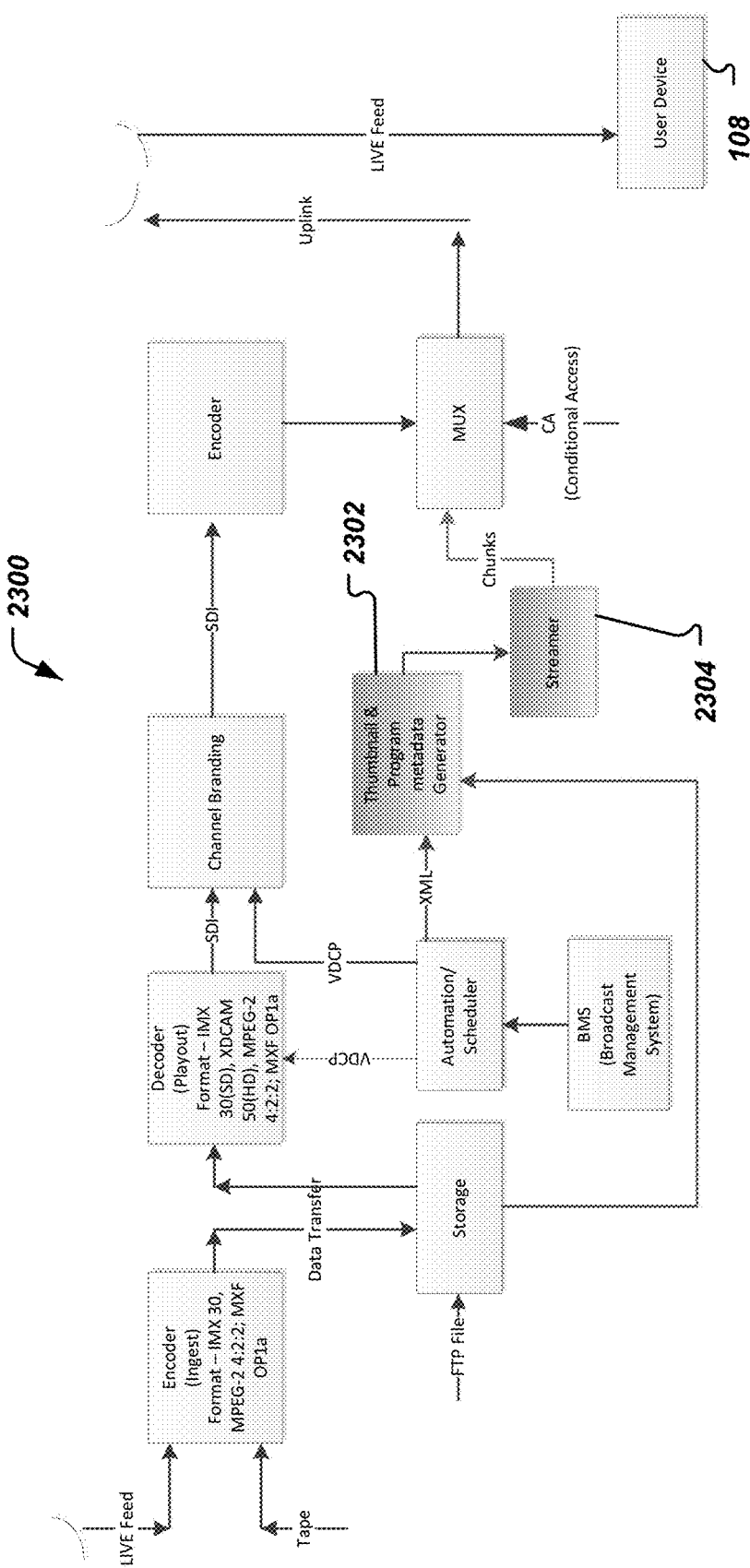
FIG. 23 depicts a high-level architecture of an example one-way communication network to deliver re-sized images of programs (or thumbnail images) to the end user devices. In this example, we deliver thumbnail images using data carousel in the similar way to deliver program meta-data over the one-way communication network.

FIG. 23 depicts a block diagram representation of an example communication network 2300 to deliver re-sized images of programs (or thumbnail images) to the end user devices 108. The user device 108 may receive a live feed over a wireless network such as a satellite network. On the network side, the video content may be received from live feeds or tapes or other media into an ingest encoder. The encoder may format, encode or process the feeds to produce encoded video data for storage in a storage module. The storage module may also receive pre-encoded data using transfer protocols such as the file transfer protocol. The stored data may be played out to a decoder under the control of a headend control system such as the broadcast management system (BMS) that may schedule, using a scheduler module, the playout. The decoded video data may be re-encoded prior to transmission using a second encoder (non ingest), multiplexed with preview snapshots and provided for uplinking.

In the example in FIG. 23, the "Thumbnail & Program Meta-data Generator" module 2302 generates JPEG images based by capturing MPEG data of the programs and commands the "Streamer" module 2304 to broadcast the JPEG images by mixing other meta-data of the programs including entitlement management messages EMMs and entitlement control messages ECMs. Once the user device 108 receives the JPEG images, the user device 108 stores the JPEG images into a database along with other program related data and use for presentation on display during channel changes, as described in the present document. The scheduler may further provide an extensible markup language (XML) description of stored programs to the module 2302 such that the notion of a "channel number" is associated with the programs. This notion of channel number may be used to provide previews during "channel up" or "channel down" operations as described in the present document.

Some aspects of the disclosed techniques are described using two example channel change scenarios.

EXAMPLE 1

FIG. 1 shows an example of a program viewing display 150 in which a current program 154 is being displayed in a full-screen mode, i.e., the window in which the current program 154 is being displayed is occupying substantially all of the display area. In the illustrated example, the display 150 may be generally rectangular in shape and may be defined by a bottom edge 156, a top edge 158, a left edge 160 and a right edge 162, all defined relative to a viewer's perspective.

While watching the current program 154, a user may initiate a channel change operation. For example, the use may press a "channel up" or a "channel down" button on a remote control unit associated with the user device, or may press a channel change button or on-screen menu on the user device.

FIG. 2 shows an example of a display status 200 that, in response to the channel change command, the display 150 is updated such that the current program 154 is now presented in a window 202, which is occupying less than all of the display area. In some embodiments, e.g., when a user device has sufficient resources (graphics memory, packet filtering, decryption, tuner, etc.), additional windows 204, 206 may present content from one channel up/one channel down by stacking the windows 202, 204 and 206 in a vertical arrangement (i.e., from the top edge of the display 150 to the bottom edge of the display 150).

In some embodiments, the content from the previous/next channels that is displayed in the windows 204, 206 may initially be static, i.e., still pictures and not moving video. These still pictures may be received by the user device from time to time (e.g., once every 5 to 10 seconds) as thumbnail graphics for the channel lineup available to the user. In some embodiments, the content from the previous/next channels displayed in the windows 204, 206 may be assembled on-they-fly, i.e., based on data packets received for the respective channels (e.g., initially decoding and presenting all received intra-coded blocks, followed by predictively coded blocks, and so on).

The transition from display status depicted in FIG. 1 (user watching a first program) to the display status 200 can be very rapid, e.g., within a single frame refresh time (33 milliseconds for 30 frames per second display or 16.7 milliseconds for a 60 Hz frame rate). In one advantageous aspect, the rapid transition from FIG. 1 to FIG. 2 display status may thus provide the user an instantaneous feedback that the user device has received the channel change command and is working on changing the channel for the user. The transition of the current program 154 to the window 202 may be performed in a visually continuous manner, e.g., by elastically shrinking the window from the full-screen mode to the less-than-full-screen mode.

In some embodiments, a secondary program, e.g., an advertisement, may be displayed on the display area 208 that is un-occluded by the windows 202, 204, 206. In some embodiments, the user device may receive location information about which portion of an advertisement within the picture area is of a greater importance to the advertiser. This non-occlusion information may be used by the user device to adjust the on-screen positions of windows 202, 204, 206 such that the important content in the advertisement is visible to the user. For example, an advertiser may identify a logo, or a sale price display region as the non-occlusion region. In some embodiments, the user device may use multiple graphics layers in a graphics memory to produce the final on-screen picture. For example, the advertisement content 208 may correspond to a background graphics layer while the program windows 202, 204, 206 may correspond to one or more foreground graphics layers. In some embodiments, alpha-blending may be used, with alpha values between 0 and 1 (inclusive) to produce the composite picture on the display 150.

The display status 200 shows a time instant at which the window 202 that shows the current program 154 is being rescaled (shrunk), but may still larger than the other program windows 204 and 206. In various embodiments, the different display sizes of windows 202 and 204/206, may be overlapping or non-overlapping with each other and may display moving videos or static pictures.

FIG. 3 shows an example display status 300 in which the current program window 302 has been rescaled to its minimum size. In the depicted example, all three windows 302, 204 and 206 have similar or identical sizes and are in vertical alignment with respect to their left and right edges. The term "vertical" in this context refers to the arrangement of windows in the direction between the top edge of the display and the bottom edge of the display from a viewer's perspective.

In some embodiment, during the rescaling from FIG. 1 to FIG. 2 to FIG. 3, the video content displayed in windows 202, 302 may be held static, e.g., freeze a last program picture frame that was being displayed before the channel change was initiated. In other embodiments, the content within windows 202, 302 may be active, or correspond to video (e.g., moving pictures) content.

In some embodiments, the display status 300 may arrange the program windows 302, 204 and 206 to be non-overlapping and having window separation areas that may display icons 304, 306 indicative of relationships between displayed program windows (e.g., an up-arrow 304 indicating a channel-up direction and a down-arrow 306 indicating a channel-down direction).

In some embodiments, the display 150 may include a visual cue that the position of the program window 302 is a "seed position" to which a window fits to at the end of the rescaling process and immediately prior to the scrolling process or vice-a-versa.

FIG. 4 shows an example of an intermediary display status 400 while program windows 402, 404 and 406 have been animated to move in the vertical direction (from/to top edge and bottom edge of the display 150). For example, compared to windows 206 and 208, the window 406 has almost been scrolled out of the active picture area from the top picture edge 158, while window 404 occupies a greater portion of the display compared to window 204.

FIG. 5 shows an example of another intermediary display status 500. The current program window 502 is only partially visible in the display area 150 because some portion of the window has gone beyond the top edge of the display 150. The window 504 that is depicting the next program has grown bigger as it appears to emerge from the lower edge of the display in an upward direction.

Figure 6:
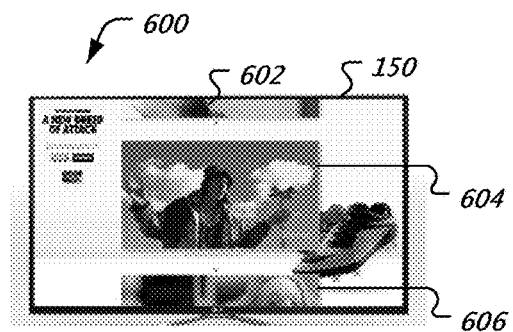
FIG. 6 shows an example display screen on which a current program and a next program are displayed and further scrolled in a vertical direction such that the second program is in an on-screen position.

FIG. 6 shows an example of a display status 600 in which the window 604 for the next channel has moved into a position previously occupied the current program window 302 (see FIG. 3).

Figure 7:
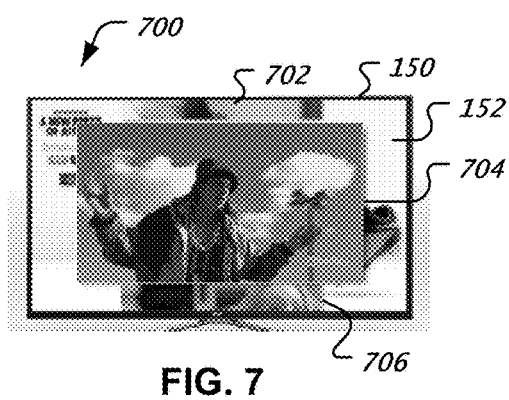
FIG. 7 shows an example display screen on which the next program is being rescaled to occupy entire display area.

FIG. 7 shows an example of a display status 700 in which the window 704 for the new program is being rescaled to expand to eventually occupy the entire display. The windows displaying the current program 702 (which is now the previously watched program) and another program 706 may optionally be present. Further, the advertisement 152 may still be partially visible.

Figure 8:
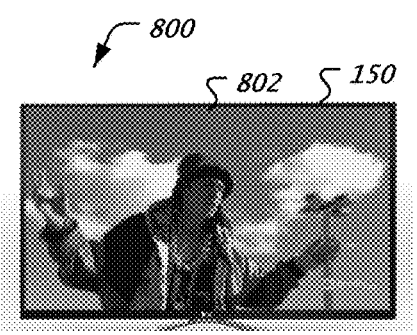
FIG. 8 shows an example display screen on which the next program is displayed.

FIG. 8 shows an example of a display status 800 where a channel change is complete, and the next program is being displayed in a window 802 that occupies the entirety of the display area.

In some embodiments, the transitioning from a current program to a next program, as described with respect to FIG. 1 to FIG. 8 above may take place over about the same amount of channel change time used in current techniques (e.g., 1.5 to 2 second for a standard definition television program). In one aspect, the presently disclosed techniques can provide an instantaneous visual feedback to a user that the channel change command has been received and a channel change is underway. For example, the transition from FIG. 1 display (full screen) to FIG. 2 display (rescaling of the current program) can be almost instantaneous (<15 to 60 milliseconds).

In another aspect, the presently disclosed techniques can be implemented in ways that allow simultaneous viewing of the current program and the next program, with the visual information associated with the next program being built as more and more data packets of the next program become available. Further, an advertisement or relevant secondary program may also be displayed to a user during the channel change time. In one variant, the visual information for the next program may be sent using another mechanism such as encoded pictures that are sent out-of-band with the program content, e.g., in the form of compressed graphics thumbnails of a smaller resolution.

In another aspect, the presently disclosed techniques can be implemented to scroll the channel lineup (current program, next program and another channel(s) above or below these two programs) in a manner that is intuitive for a user. For example, the filmstrip formed by windows 204, 302, 206 (see FIG. 3) may be scrolled up or down depending on whether the user has issued a "channel up" command or a "channel down" command. The vertical movement of the program windows may also be made user-configurable so that a user can select a mode of operation of channel changes (e.g., whether to move the windows upwards or downward for a channel-up command and similarly for a channel-down command).

EXAMPLE 2

With reference to FIG. 8, FIG. 9, FIG. 10, FIG. 11, FIG. 12, FIG. 13, FIG. 14, FIG. 15, FIG. 16 and FIG. 17, an example embodiment is disclosed in which a user issues multiple channel change commands before a first channel change is completed.

FIG. 8, as previously described, depicts display status 800 where a channel change has been completed. Assume that the user selects "channel down" button once.

Figure 9:
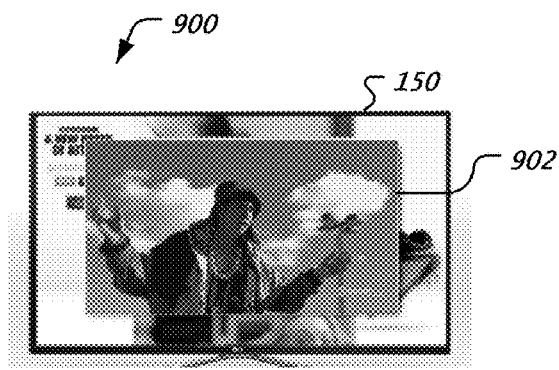
FIG. 9 shows an example display screen on which the next program is being rescaled to occupy entire display area when an additional channel change request is received.

FIG. 9 shows an intermediate display status 900 in which the window 902 is being resized to a smaller area, with a secondary program or advertisement visible in the remaining area on the display 150.

Figure 10:
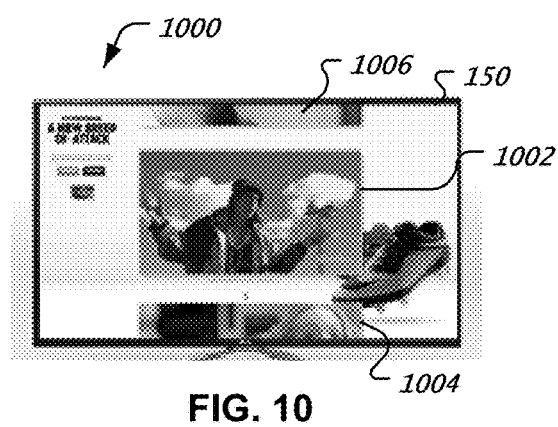
FIG. 10 shows an example display screen on which the next program is rescaled to reduce area occupied to accommodate program display window for another program.

At the display status 1000 shown in FIG. 10, the consumer issues another "channel down" command. Thus, the user has selected the "channel down" button twice indicating that he would like to change channel to the next channel down. In FIG. 10, the current program is displayed in window 1002, with one program above and one program below being partially displayed in windows 1006 and 1004 respectively.

Figure 11:
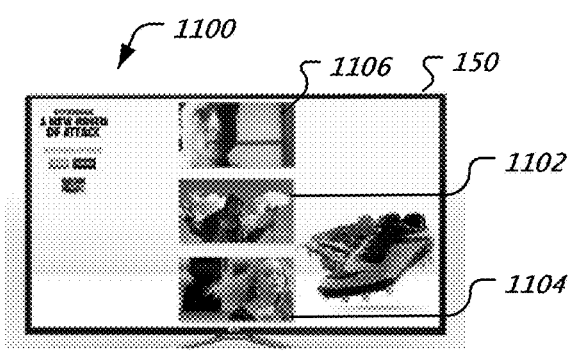
FIG. 11 shows an example display screen on which the current program, the next program and the another program are simultaneously displayed in a vertical, non-overlapping arrangement.

FIG. 11 shows an example of a display status 1100 where, in response to the second channel change command, program windows 1102 (current program), 1104 (program that the user now wants to see) and 1106 (program that was seen previously) are rescaled to fit entirely within the display 150.

Figure 12:
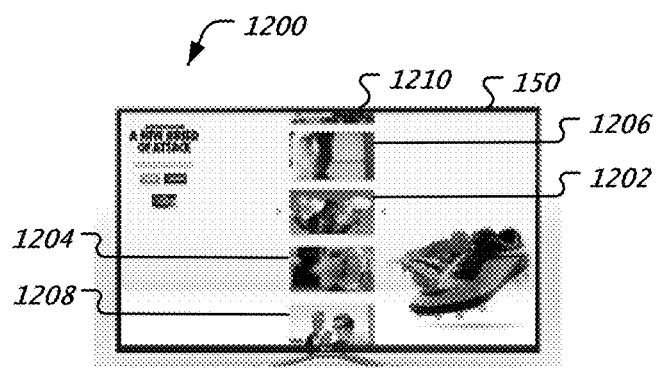
FIG. 12 shows an example display screen on which the current program, the next program and the another program are simultaneously displayed and scrolled in a vertical, non-overlapping arrangement.

FIG. 12 shows an example of a display status 1200 in which picture windows 1202, 1204, 1206, 1208 and 1210 are (either completely, or partially) visible in the display 150. These rescaled windows may be animated, or vertically scrolled to bring the user-desired program channel to a pre-designated location on the display 150. Once the program window for the next program that the user wants to see is at the pre-designated position, the program window 1204 can then be rescaled to occupy the entire display area.

Figure 13:
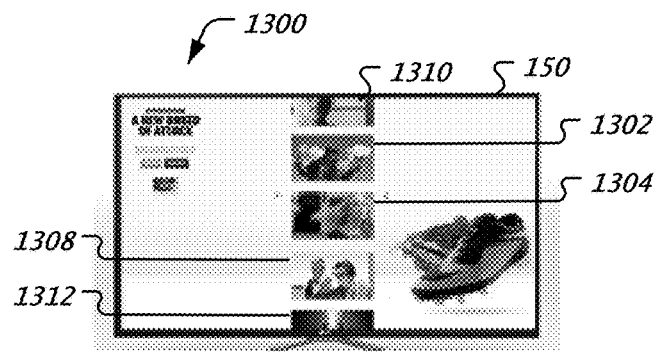
FIG. 13 shows an example display screen on which the current program, the next program and the another program are simultaneously displayed and scrolled in a vertical, non-overlapping arrangement.

FIG. 13 shows intermediary pictures while all the pictures animate downward to the next channel down, as depicted by windows 1302, 1304, 1306, 1308, 1310 and 1312 at vertically displayed positions with respect to corresponding windows 1202, 1204, 1206, 1208 and 1210 respectively.

FIG. 13 further shows an example of a display status 1300 in which all the pictures windows animate downward to the next channel down, as depicted by windows 1302, 1304, 1306, 1308, 1310 and 1312 at vertically displayed positions with respect to corresponding windows 1202, 1204, 1206, 1208 and 1210 respectively.

Figure 14:
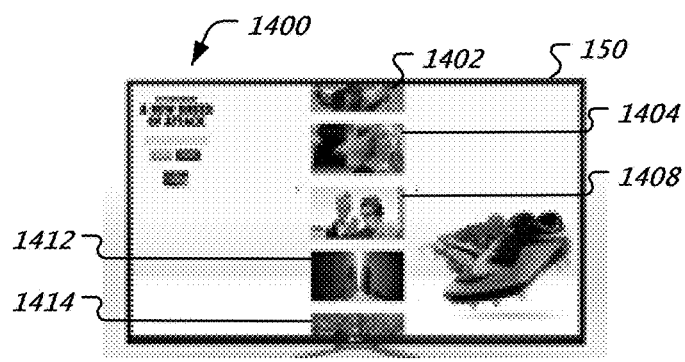
FIG. 14 shows an example display screen on which the current program, the next program and the another program are simultaneously displayed and scrolled in a vertical, non-overlapping arrangement to bring the desired another program at a position originally occupied by the current program.

FIG. 14 shows an example of a display status 1400 in which all the pictures windows animate downward to the next channel down, compared to display status 1300, as depicted by windows 1402, 1404, 1408, 1412 and 1414 at vertically displayed positions with respect to corresponding windows 1302, 1304, 1308 and 1312 respectively (window 1414 corresponds to a program not previously shown in FIG. 12 or FIG. 13).

Figure 15:
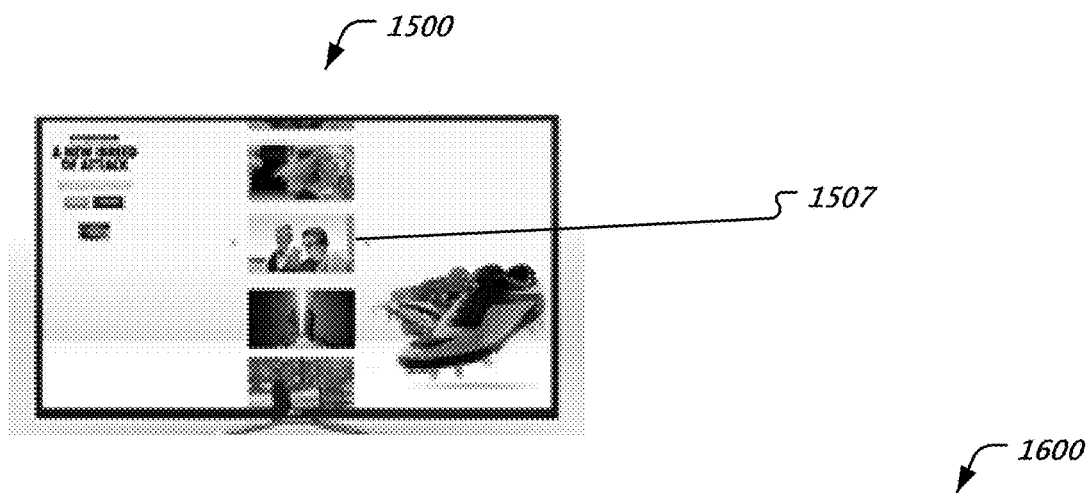
FIG. 15 shows an example display screen during a second consecutive channel change.

FIG. 15 shows an example of a display status 1500 where the program window 1507, which corresponds to the program that the user wants to watch, is at the pre-determined position from which the program window 1507 can be scaled up to occupy the entire screen area.

Figure 16:
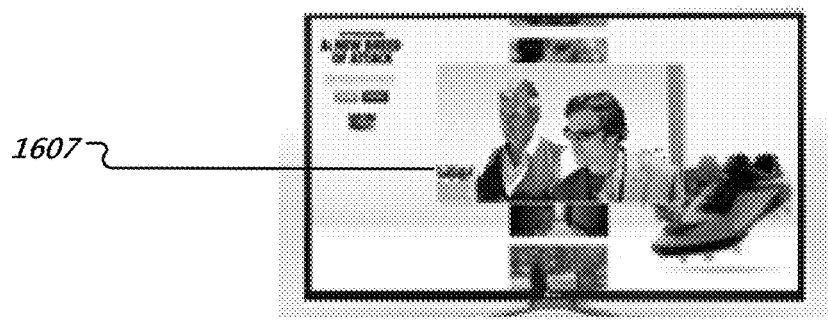
FIG. 16 shows another example display screen during a second consecutive channel change.

FIG. 16 shows an example of a display status 1600 in which the program window 1607 (corresponding to 1507) is being increased in size to scale up to the entire display screen area.

Figure 17:
FIG. 17 shows an example display screen after a second consecutive channel change is performed.

FIG. 17 shows an example of a display status 1700 in which channel change down to the next channel (2 channels down) is completed and the user-desired program is displayed in the entire display screen.

In some embodiments, all the transition described with respect to FIG. 8 to FIG. 17 may be completed normal channel change time for two (2) channels down (e.g., 1.5 to 3 seconds).

In some embodiments, the secondary program 152, displayed on the display 150 as a background to the program windows, may be adaptive based on consumer habits with respect to channel changes.

In some embodiments, the display may comprise multiple layers that are blended together. For example, each program window (e.g., five program windows displayed in 1300) may comprise a separate graphics layer, with one additional graphics layer for the background advertisement. In addition, pop-in and pop-out linear icons or live content tiles may be displayed on another graphics layer to the user.

In some embodiments, a graphic layer may depict visual display widget that provides a channel change progress feedback to a user. For example, in some embodiments, a time bar may be displayed, that is progressively filled in to indicate a percent or an amount of progress made in changing a channel. In some embodiments, the progress bar may have visible markers or milestones and the progress bar may be filled in up to the marker upon completion of the corresponding task (e.g., "program tables parsed" "channel acquired" "video decrypted" "buffer filled" etc.) In some embodiments, textual messages may be displayed to the user reporting progress in channel change operations.

It will be appreciated that the disclosed techniques for displaying channel changes to a user can be implemented to operate without slowing down the channel change time experienced by the user. In other words, all the UI changes from a full screen display of one channel to a full screen display of another channel can be finished within the normal channel change time.

In some embodiments, a display may be rectangular (e.g., conventional 16:9 or 4:3 formats). In some embodiments, a display may be rectangular and may be in a portrait mode orientation. In some examples, a display may include at least one curvilinear edge, e.g., a circular or an oval display. In some examples, the display may be a flexible display that can be bent in a horizontal and/or vertical direction.

In various embodiments, different shapes and sizes of display 150 may be used. For example, in some embodiments, a display may be generally circular in shape and the first window may transition out of the display in a linear translation in the vertical (upward or downward) direction. In some embodiments, the first window may transition generally from the center of the display in an outwardly spiraling manner. Furthermore, while this document discloses techniques in which windows are animated in a vertical direction, other embodiments in which windows are animated in the horizontal or diagonal directions are possible also. In various embodiments, the advertisements may include still or moving picture advertisements or additional content elements such as graphics, system information, messages (e.g., weather, horoscope, etc.), and so on.

Figure 18:
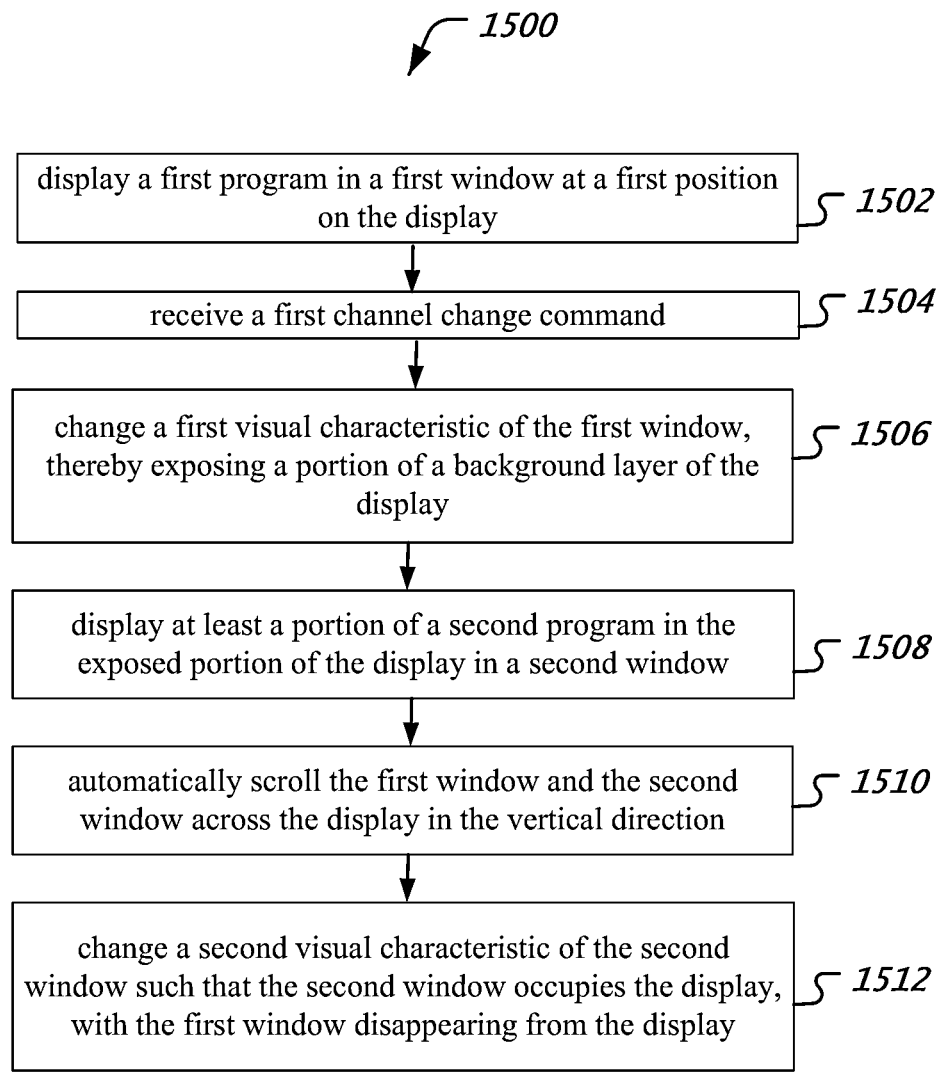
FIG. 18 is a flowchart of an example method for a visual presentation of a channel change.

FIG. 18 is a flowchart depiction of an example method 1500 for visually presenting channel changes on a display.

At 1502, the method 1500 displays a first program in a first window at a first position on the display. For example, as depicted in FIG. 1, the first window may occupy the entire screen area and the first position may simply overlap with the display area.

At 1504, the method 1500 receives a first channel change command. The channel change command may be a command to go up by one channel or go down by one channel.

At 1506, the method 1500 changes, in response to the first channel change command, a first visual characteristic of the first window, thereby exposing a portion of a background layer of the display. In some embodiments, the first visual characteristic may, e.g., by the size of the display window and/or the alpha value weight applied to the window during blending of various graphics layers. In some embodiments, the visual characteristic may be changed by cropping the display of the first program to only display the portion that fits within the first window. In some embodiments, the first visual characteristic is changed by re-scaling the picture. That is, the user may still be able to see the entire frame of video, but at a reduced resolution to fit within a smaller window.

In some embodiments, the method 1500 may provide a visual cue to identify the first position on the display. For example, as previously disclosed, a seed position may be identified using a semi-transparent outline, or using an alignment arrow.

At 1508, the method 1500 displays at least a portion of a second program in the exposed portion of the display in a second window that is positioned in a vertical direction with respect to the first window. As previously disclosed, in some embodiments, the vertical direction scrolling may move the window towards the top edge (and away from the bottom edge) or towards the bottom edge (and away from top edge) of the display.

In some embodiments, when the user command is a "channel-up" command, the first and the second windows are moved in the downward direction. This enables replacement of the first program window by the next program window above it (i.e., window towards the top edge).

In some embodiments, the first channel change command includes a channel-down command and the automatic scrolling moves the first window and the second window in a vertically downward direction. In some embodiments, a user is given control of specifying which way the user would like to see window movement to happen for channel up and channel down commands.

At 1510, the method 1500 automatically scrolls the first window and the second window across the display in the vertical direction, such that the first window begins to move out of the display while the second window begins to move in a direction of the first position.

In some embodiments, the method 1500 displays an additional content element (e.g., an advertisement or another informational text or graphics) on the background layer such that at least a portion of the advertisement that is non-overlapping with the first window and the second window is visible. The method 1500 may start the advertisement display as soon as the first display characteristic is changed or may start the advertisement display during the scrolling operation.

At 1512, the method 1500, changes, after the second window is at the first position on the display, a second visual characteristic of the second window such that the second window occupies the display, with the first window disappearing from the display. The second visual characteristic may comprise cropping the program, re-scaling the program and so on.

Figure 19:
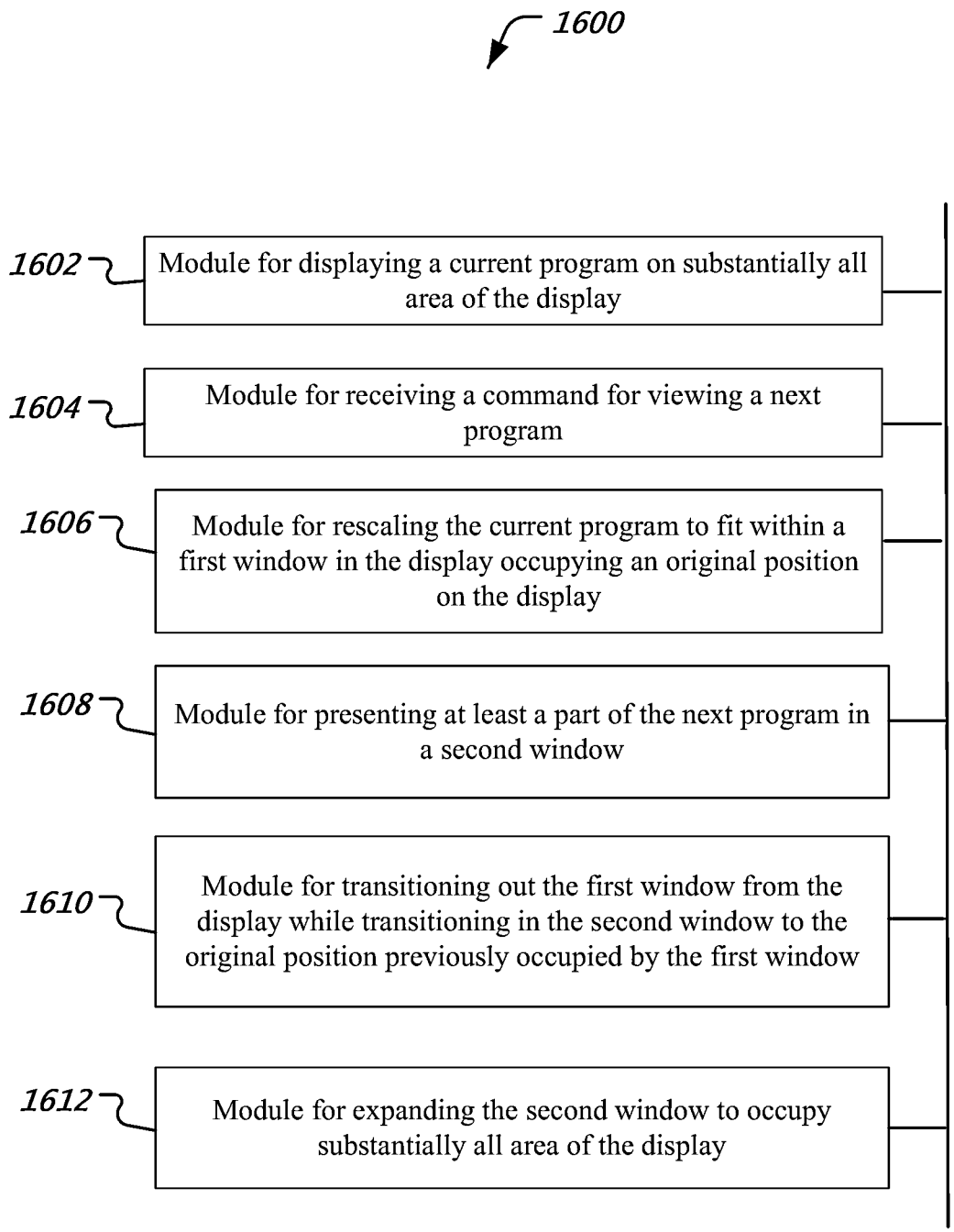
FIG. 19 is a block diagram of an example apparatus that presents channel changes in a visually continuous manner.

FIG. 19 is an example of a block diagram representation of an apparatus 1600 for providing visually continuous channel changes on a display.

The module 1602 (e.g., a display module) displays a current program on substantially all area of the display.

The module 1604 (e.g., a command reception module) receives a command for viewing a next program.

The module 1606 (e.g., a first rescaler module) rescales, in response to the command, in a visually continuous manner, the current program to fit within a first window in the display occupying an original position on the display.

The module 1608 (e.g., a presentation module) presents, at least a part of the next program, in a second window that is positioned in a second portion of the display that is non-overlapping with the first portion.

The module 1610 (e.g., a window transition module) transitions out, in a visually continuous manner, the first window from the display while transitioning in the second window to the original position previously occupied by the first window.

The module 1612 (e.g., a second rescaler module) expands the second window, after the second window is at the original position, to occupy substantially all area of the display.

In some embodiments, the apparatus 1600 further includes a secondary program display module that displays a secondary program on the display such that the secondary program is visible in an area of display not occupied by the first window and the second window. In some embodiments, the apparatus 1600 includes an ad analysis module that determines a key portion of the secondary program, and a window positioning module that positions, based on the key portion of the secondary program, a position for the first window in the display. The ad analysis module may use techniques such as pattern recognition to extract visual information in advertisements or may be provided with un-occlusion information associated with advertisements. In some embodiments, the apparatus 1600 includes an ad selection module that selects the secondary program based on at least one of the current program and the next program (e.g., if a user was watching a sports program, then display an ad relevant to sports, as indicated by keywords associated with the ad).

In some embodiments, the input programs may be received as an MPEG (moving pictures expert group) transport stream in MPEG-2 or H.264 or H.265 format. Video encoded using these formats may be encoded as intra blocks that includes all content information for decoding or as inter coded blocks that are encodes as a difference from another picture block. In such embodiments, the apparatus 1600 may include a program decoder module that receives, during the period of time, additional video data for the next program, decodes the additional video data and makes the decoded additional video data available to the presentation module, such that the presentation module refreshes the second window to render the decoded additional video data upon availability thereof.

In a multi-channel content delivery system, the term "channel" often has a contextual meaning. For example, at the physical layer, a "channel" may refer to a frequency band (e.g., a 6 MHz frequency band in coaxial cable transmissions in the United States). At the application layer, the term "channel" may simply refer to an audio/video program (or an audio-only program). In analog transmission systems, one physical layer channel often mapped to one application layer channel (or program). In digital video delivery, when a user presses a "channel up" button, to fulfill this command, the user device may or may not have to change a physical radio frequency (RF) on which the user device can receive the corresponding content. In digital cable or satellite delivery systems, a physical channel often carries content for 10 to 12 video programs (application layer "channels") and some user commands to go up by a channel can be met without having to make any changes to the RF frequency of reception. In Internet Protocol (IP) based program delivery systems, all programs may be received on the same RF (physical layer) channel, and a "channel up" "channel down" command may be fulfilled by simply using a different filtering criteria for received packets.

Figure 20:
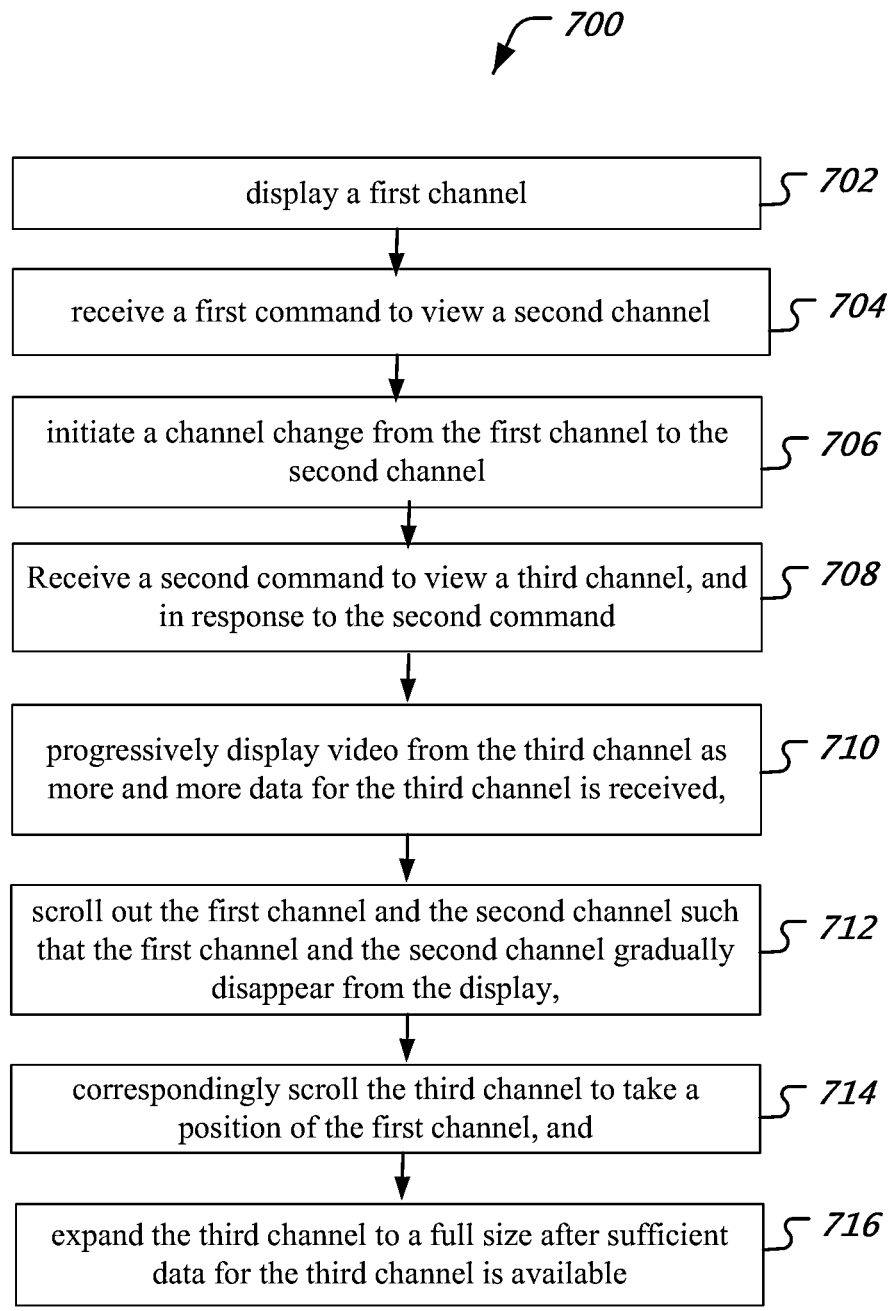
FIG. 20 is a flowchart of an example method for a visual presentation of a channel change in response to a sequence of multiple channel change commands.

FIG. 20 is an example of a flowchart representation of a method 1700 for controlling a display to provide an enhanced (e.g., visually seamless) channel change experience.

At 1702, the method 1700 displays a first (application layer) channel (e.g., FIG. 1). At 1704, the method 1700 receives a first command to view a second channel.

At 1706, the method 1700 initiates a channel change from the first channel to the second channel, in which the channel change includes reducing a display size of the first channel, progressively displaying video from the second channel as more and more data for the second channel is received, scrolling out the first channel such that the first channel gradually disappears from the display, correspondingly scrolling the second channel to take an on-screen position of the first channel, and expanding the second channel to a full size after sufficient data for the second channel is available.

At 1708, the method 1700 receives, amid the channel change and prior to the expanding the second channel to the full size, a second command to view a third channel, and in response to the second command.

At 1710, the method 1700 progressively displays video from the third channel as more and more data for the third channel is received, scrolling out the first channel and the second channel such that the first channel and the second channel gradually disappear from the display, correspondingly scrolling the third channel to take a position of the first channel, and expanding the third channel to a full size after sufficient data for the third channel is available.

As previously disclosed with respect to FIG. 8 to FIG. 17, in some embodiments, the method 1700 may display at least a portion of video from the first channel and the second channel while progressively displaying video from the third channel (e.g., FIG. 12, FIG. 13, FIG. 14, etc.). In some embodiments, the method 1700 may tune, in response to receiving the first command to view the second channel, a radio frequency tuner to a different frequency. The turning may be performed when the method 1700 determines that the user-requested next channel is not available on the same physical layer channel but is available on another carrier.

In embodiments that use both intra- and inter-coded video, the method 1700 may progressively display video from the second channel by initially decoding and displaying intra coded blocks of the video from the second channel, and further decoding and displaying inter coded blocks of the video from the second channel upon availability of reference blocks for the inter code blocks.

In some embodiments, the method 1700 may reduce sizes of the first window and the second window to make content for multiple video programs visible to the use, thereby providing an easy preview of programming available on other channels. For example, display status 1200, 1300 and 1400 each show 5 different windows in which 5 consecutive programs are concurrently displayed to the user.

Figure 21:
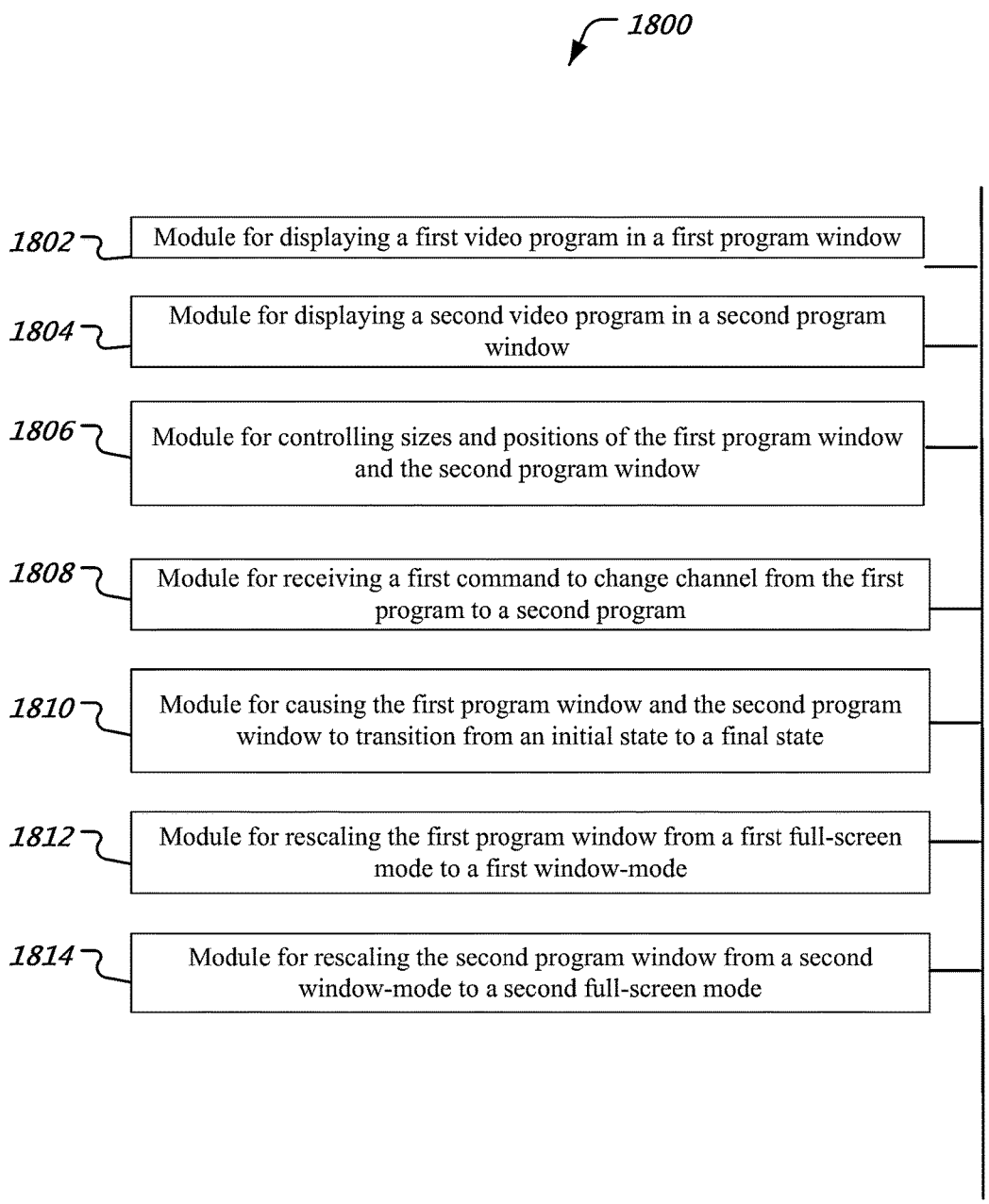
FIG. 21 is block diagram of an example apparatus that provides a visual presentation of a channel change in response to a sequence of multiple channel change commands.

FIG. 21 is an example of a block diagram representation of an apparatus 1800 for displaying multiple video programs simultaneously.

The module 1802 (e.g., a first display module) displays a first video program in a first program window.

The module 1804 (e.g., a second display module) displays a second video program in a second program window.

The module 1806 (e.g., a display window management module) controls sizes and positions of the first program window and the second program window such that the second program window is non-overlapping with and positioned directly above or below the first program window. In this context, the terms "above" and "below" refer to arrangement of the program windows (e.g., windows 1202, 1204, 1206, 1208) on the display screen and tiled in a vertical direction toward or away from the top edge 158 of the display 150.

The module 1808 (e.g., a command module) receives a first command to change channel from the first program to a second program.

The module 1810 (e.g., a transition module) causes, responsive to the first command, the first program window and the second program window to transition from an initial state in which the first program window is completely visible and at a first position on the screen and a final state in which the first program window is completely invisible and the second program window is at the first position.

The module 1812 (e.g., a first rescaler module) rescales the first program window from a first full-screen mode in which the first program window occupies an entire screen display area to a first window-mode in which the first program window occupies less than the entire screen display area.

The module 1814 (e.g., a second rescaler module) rescales the second program window from a second window-mode in which the second program window occupies less than the entire screen display area and a second full-screen mode in which the second program window occupies the entire screen display area.

In some embodiments, the apparatus 1800 includes a secondary program display module that displays a secondary program to be visible in an area of display not occupied by the first program window and the second program window.

In some embodiments, the transition module controls transition from the initial state to the final state in an amount of time during which image information for an entire picture of the second program is received.

In some embodiments, the transition module controls the transition from the initial state to the final state by scrolling the first program window and the second program window in a vertical direction such that any portion of the first program window and the second program window that falls outside the screen is not displayed.

It will be appreciated that the disclosed techniques can be used to visually engage a user by presenting animated program windows and/or advertisements and/or other animation during a channel change, thereby improving a user's experience during channel change times.

It will further be appreciated that the disclosed technique provide additional opportunities to content providers, network operators and device makers, do generate advertisement revenue by using the additional time resources (channel change time) and screen real estate (display area that is not occluded by program windows) to display advertisements to a user.

The disclosed and other embodiments, the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As a specific example, an example processing code is included below to illustrate one implementation of the above disclosed processing.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for visually presenting channel changes on a display, comprising:
    displaying a first video of a first program in a first window occupying substantially all of the display at a center position on the display;
    receiving a first channel change command;
    in response to the first channel change command:
        reducing the display area of the first window, thereby exposing a portion of a background layer of the display;
        displaying at least a portion of a second video of a second program in the exposed portion of the display in a second window that is positioned in a vertical direction with respect to the first window;
        automatically scrolling the first window and the second window across the display in the vertical direction, such that the first window begins to move out of the display while the second window begins to move in a direction of the center position;
        after the second window is at the center position on the display, expanding the display area of the second window such that the second window occupies substantially all of the display.

2. The method of claim 1, further comprising:
    displaying, during the scrolling operation, an additional content element ("ACE") on the background layer such that at least a portion of the ACE that is non-overlapping with the first window and the second window is visible.

3. The method of claim 2, wherein the ACE comprises an advertisement.

4. The method of claim 1, wherein the first channel change command includes a channel-up command and wherein the automatically scrolling in the vertical direction includes moving the first window and the second window in a vertically downward direction.

5. The method of claim 1, wherein the first channel change command includes a channel-down command and wherein the automatically scrolling in the vertical direction includes moving the first window and the second window in a vertically downward direction.

6. The method of claim 1, further comprising:
    receiving a second channel change command prior to expanding the display area of the second window; and
    replacing the second video of the second program with a third video of a third program.

7. The method of claim 1, wherein the first video of the first program is held static in response to the first channel change command.

8. The method of claim 1, wherein the first video of the first program remains active in response to the first channel change command.

9. The method of claim 1, further comprising displaying, during the scrolling operation, arrows indicating channel directions on the background layer.

10. The method of claim 1, wherein the first window and the second window have the same width during the scrolling operation.

11. An apparatus for providing visually continuous channel changes on a display having a display area, comprising a processor and a non-transitory computer-readable medium implementing:
- a display module that displays a first video of a current program on substantially all of the display area;
- a command reception module that receives a command for viewing a second video of a next program;
- a first rescaler module that rescales, in response to the command, in a visually continuous manner, the first video of the current program to fit within a first window having a display area that is smaller than substantially all of the display area in the display occupying an original position on the display;
- a presentation module that presents, at least a part of the second video of the next program, in a second window having a display area that is smaller than substantially all of the display area that is positioned in a second portion of the display that is non-overlapping with the first portion;
- a window transition module that transitions out, in a visually continuous manner, the first window from the display area while transitioning in the second window to the original position previously occupied by the first window; and
- a second rescaler module that expands the second window, after the second window is at the original position, to occupy substantially all of the display area.

12. The apparatus of claim 11, further including:
- a secondary program display module that displays a secondary program on the display such that the secondary program is visible in an area of display not occupied by the first window and the second window.

13. The apparatus of claim 12, further including:
- an ad analysis module that determines a key portion of the secondary program; and
- a window positioning module that positions, based on the key portion of the secondary program, a position for the first window in the display.

14. The apparatus of claim 12 further comprising:
- an ad selection module that selects the secondary program based on at least one of the current program and the next program.

15. The apparatus of claim 11, wherein the window transition module transitions out the first window from a top edge or a bottom edge of the display by linearly shifting the first window over a period of time.

16. The apparatus of claim 15, further comprising:
- a program decoder module that receives, during the period of time, additional video data for the next program, decodes the additional video data and makes the decoded additional video data available to the presentation module; and wherein
- the presentation module refreshes the second window to render the decoded additional video data upon availability thereof.

17. The apparatus of claim 11, wherein the first video of the first program is held static in response to the command.

18. The apparatus of claim 11, wherein the first video of the first program remains active in response to the command.

19. A method for controlling a display to provide an enhanced channel change experience, comprising:
- displaying a first channel;
- receiving a first command to view a second channel;
- initiating a channel change from the first channel to the second channel, in which the channel change includes reducing a display size of the first channel, progressively displaying video from the second channel as more and more data for the second channel is received, scrolling out the first channel such that the first channel gradually disappears from the display, correspondingly scrolling the second channel to take an on-screen position of the first channel, and expanding the second channel to a full size after sufficient data for the second channel is available;
- receiving, amid the channel change and prior to the expanding the second channel to the full size, a second command to view a third channel, and in response to the second command; and
- progressively displaying video from the third channel as more data for the third channel is received, scrolling out the first channel and the second channel such that the first channel and the second channel gradually disappear from the display, correspondingly scrolling the third channel to take a position of the first channel, and expanding the third channel to a full size after sufficient data for the third channel is available.

20. The method of claim 19, wherein the scrolling is not in a vertical direction.

21. The method of claim 20, further comprising:
- displaying at least a portion of video from the first channel and the second channel while progressively displaying video from the third channel.

22. The method of claim 20, further including:
- tuning, in response to receiving the first command to view the second channel, a radio frequency tuner to a different frequency.

23. The method of claim 20, wherein the progressively displaying video from the second channel includes:
- initially decoding and displaying intra coded blocks of the video from the second channel; and
- further decoding and displaying inter coded blocks of the video from the second channel upon availability of reference blocks for the inter code blocks.

24. The method of claim 20, further including:
- selectively reducing on-screen display sizes of the first channel and the second channel based on a screen area available for displaying the third channel.

25. The method of claim 19, wherein the first program is held static during the channel change.

26. The method of claim 19, wherein the first program remains active during the channel change.

* * * * *